United States Patent Office  3,189,430
Patented June 15, 1965

3,189,430
HERBICIDE COMPOSITION AND METHOD
James A. Kelly, Midland, and George W. Scoles, Hemlock, Mich., assignors to The Dow Chemical Company, Midland, Mich., a corporation of Delaware
No Drawing. Filed June 21, 1957, Ser. No. 667,286
7 Claims. (Cl. 71—2.6)

This invention is concerned with herbicides and is particularly directed to a method and improved composition for the application of systemic herbicidal agents.

The systemic herbicidal agents with which the present invention is concerned are those herbicides which are absorbed by the foliage and stems of vegetation and appear to be transported so that substantially all of the plant is killed when sufficient of the agent is applied. These agents are in contrast to the contact herbicides which burn or kill only that portion of the plant actually contacted with the agent.

According to the present invention, it has been discovered that markedly improved results are obtained when employing systemic herbicides as viscous water-in-oil emulsion compositions. It is among the advantages of the invention that increased deposits of the herbicidal composition are obtained, better control of dosage is possible and improved kill is accomplished with less hazard from spray drift to nearby desirable vegetation, all in contrast to the results obtained with conventional aqueous herbicidal compositions wherein the aqueous phase is the external phase.

The compositions of the invention are prepared by dissolving the systemic herbicide in a water-immiscible solvent together with a suitable emulsifying agent and adding to the resulting solution sufficient water to form a viscous emulsion. In such operation, the water is added to the solution portionwise with moderately vigorous agitation. The degree of agitation is somewhat critical in that sufficient agitataion is required to disperese the water into emulsion form in the water-immiscible solvent without, however, employing excessive agitation attended by strong shearing forces which tend to break the desired emulsion. Thus, mixing devices which involve strong shearing forces, such as gear pumps, jet nozzles with fine orifices and the like, are undesirable. Good results have been obtained when using paddle agitators of the type commonly employed in paddle-agitated agricultural spray tanks.

Suitable water-immiscible solvents for use in accordance with the invention include polyglycol alkyl ethers, chlorinated hydrocarbons, aromatic oils, petroleum distillates, mineral oils and the like. For reasons of economy and ease of application, it is desirable to employ simple hydrocarbon solvents such as aromatic hydrocarbons, naphthas and petroleum distillates and of these the petroleum distillates characterized by relatively low volatility, such as kerosene, fuel oil and diesel oil are preferred. The term "water-in-oil emulsion" as herein employed refers to an emulsion of water in one or a mixture of the water-immiscible solvents as set forth above.

In the preparation of the compositions of the invention any suitable emulsifying agent may be employed provided it is capable of accomplishing the formation of a water-in-oil type of emulsion under the emulsification conditions as set forth above. Such emulsifying agents are generally somewhat hydrophobic in nature in contrast to emulsifying agents which more readily form oil-in-water type emulsions. In general, good results have been obtained when employing emulsifying agents such as fatty acid esters of hexitans, polyoxyethylene sorbitol poly-fatty acid esters and oxyalkylene derivatives of long-chain aliphatic amines. Representative commercial emulsifying agents which have been found useful in the invention are the monopalmitate, mono-stearate and mono-oleate of sorbitan, sorbitan trioleate, polyoxyethylene sorbitol pentaoleate and oxyethylene derivatives of octadecylamine containing from 2 to 5 oxyethylene groups per mole of octadecylamine.

Any suitable systemic herbicide may be employed in the compositions. Of such herbicides, the chlorophenoxy aliphatic acids such as 2,4-dichlorophenoxyacetic acid, 2,4,5 - trichlorophenoxyacetic acid, 4-chloro-2-methylphenoxyacetic acid, 3,4-dichlorophenoxyacetic acid, α-(2,4,5-trichlorophenoxy) propionic acid and gamma-(2,4-dichlorophenoxy) butyric acid and the oil-soluble esters thereof constitute a preferred group.

In carrying out the invention, it is generally desirable to prepare a concentrate composition comprising the active systemic herbicide and the emulsifying agent. Such concentrates are adapted to be diluted with further oil before adding the water to prepare the finished water-in-oil emulsion. Concentrate compositions also frequently contain one or more organic solvents such as polyglycol ethers, aromatic naphthas or petroleum distillates.

The amounts and proportions of the ingredients in the compositions of the invention may vary within limits depending upon the particular ingredients employed and the type of vegetation to be controlled therewith provided that (1) a herbicidal amount of the systemic herbicide is incorporated in the composition and (2) sufficient water is introduced into the emulsion to produce a thick, viscous emulsion composition. In general, at least about 0.03 percent by weight of systemic herbicide and from about 0.04 to about 0.5 percent by weight of emulsifying agent is employed based on the weight of the finished emulsion composition and the proportions of oil and water are adjusted to provide from about 10 to 35 parts by volume of oil per 100 parts by volume of finished emulsion. In concentrate compositions suitable for subsequent dilution and emulsification, from about 10 to about 80 percent by weight of systemic herbicide is employed with at least about 5 percent of emulsifying agent, the balance of the concentrate being one or more of the water-immiscible solvents.

When operating in accordance with the invention, the emulsion compositions, as set forth above, are applied with suitable pressure spraying equipment to the above ground parts of the vegetation to be controlled. The choice of spray equipment is somewhat critical in order to accomplish the application of the water-in-oil emulsion with proper force and dispersion and without causing the emulsion to break. Desirable equipment for accomplishing such application employs piston pumps for pressurizing the emulsion and is free of fine orifices or other constrictions which introduce excessive shearing of the emulsion. Good results have been obtained when employing spray nozzles which operate to distribute a fan-shaped spray by impinging a rapidly moving stream of the composition on a curved, flared metal plate.

The following examples illustrate the invention but are not to be construed as limiting the same.

*Example 1*

The following composition was prepared by blending the ingredients to produce a homogeneous liquid concentrate.

Ingredient: Percent by weight
  Mono- and poly-propylene glycol butyl ether esters of 2,4-dichlorophenoxyacetic acid ____ 34.5
  Mono- and poly-propylene glycol butyl ether esters of 2,4,5-trichlorophenoxyacetic acid _ 32.8

| Ingredient: | Percent by weight |
|---|---|
| Sorbitan mono-oleate (Span 80) | 20.0 |
| Aromatic naphtha | 12.7 |

The above formulation has a specific gravity at 68° F. of 1.124 and contained 2 pounds acid-equivalent of 2,4-dichlorophenoxyacetic acid and 2 pounds acid-equivalent of 2,4,5-trichlorophenoxyacetic acid per gallon. The esters of the sbstituted chlorophenoxyacetic acids in the above formulation were commercial products and each consisted of about 77 percent by weight of the monopropylene glycol butyl ether ester with about 17 percent of the dipropylene glycol butyl ether ester and 6 percent of the tripropylene glycol butyl ether ester.

The above concentrate composition was dissolved in fuel oil to produce a solution of one quart of the above concentrate in 3.5 gallons of fuel oil. To this solution water was added with vigorous stirring to produce a water-in-oil emulsion. The addition of water was continued to give a final volume of 25 gallons of emulsion composition in the form of an opaque, viscous spray composition. The latter was applied with a pressure sprayer equipped with a nozzle which operated to distribute a fan-shaped spray by impinging the pumped stream of composition on a curved, flared metal plate. The spray was applied to an area infested with sprouts of Northern pin oak which had grown up from the stumps remaining after the felling of the oaks. On observation about 3 months after the above application, it was found that excellent kills of the pin oak sprouts had been obtained.

*Example 2*

The following composition was prepared employing the glycol ether esters described in Example 1:

| Ingredient: | Percent by weight |
|---|---|
| Esther of 2,4-dichlorophenoxyacetic acid | 35.0 |
| Ester of 2,4,5-trichlorophenoxyacetic acid | 33.2 |
| Sorbitan mono-oleate | 10.0 |
| Aromatic naphtha | 21.8 |

This concentrate composition was found to be adapted for the preparation of water-in-oil emulsions as follows: One or more gallons of the concentrate was dissolved in 15 to 25 gallons of fuel oil and to the resulting solution 75 to 85 gallons of water was added portionwise with continuous agitation from a paddle agitator. A thick, viscous water-in-oil emulsion was obtained, suitable for application to plants as in Example 1.

*Example 3*

One gallon of the concentrate composition of Example 2 was dissolved in 6 gallons of fuel oil and to the resulting solution 25 gallons of water was added portionwise with continuous agitation to produce a water-in-oil emulsion. This emulsion was sprayed from a pressure sprayer operating at 40 to 50 pounds per square inch and equipped with a nozzle (Rex Nozzle No. 6) as described in Example 1. The spray was applied to a weed infested area upwind from a group of tomato plants. The tomato plants were one rod apart in rows located 15, 30, 60, 90, and 120 feet from the edge of the sprayed area. A further area positioned in an exactly similar arrangement with respect to further tomato plants was sprayed with a conventional commercial oil-in-water emulsion containing the same concentration of the above active herbicidal esters. On examination of the tomato plants 5 days after the application of the sprays, it was found that all the tomatoes growing downwind from the area sprayed with the conventional commercial oil-in-water composition had been affected by the spray and over 85 percent of said plants showed moderate to extremely severe injury. In contrast, the plants downwind from the area sprayed with the water-in-oil emulsion as set forth above showed much less severe symptoms of injury from spray drift with over 50 percent of the plants showing little or no effect from the spray.

*Example 4*

The following compositions were prepared by blending the ingredients to produce homogeneous liquid concentrates.

| Ingredient: | Percent by weight |
|---|---|
| Composition A— | |
| 2,4,5-trichlorophenoxyacetic acid | 12 |
| Tripropylene glycol monomethylether | 68 |
| Sorbitan mono-oleate | 20 |
| Composition B— | |
| Isopropyl ester of 2,4-dichlorophenoxyacetic acid | 45 |
| Sorbitan mono-oleate | 20 |
| Aromatic naphtha | 15 |
| Composition C— | |
| Ester of α-(2,4,5-trichlorophenoxy) propionic acid | 65 |
| Sorbitan mono-oleate | 20 |
| Aromatic naphtha | 15 |

The ester employed in Composition C was a commercial product consisting of a mixture of about 77 percent by weight of the monopropylene glycol butyl ether ester, about 17 percent of the dipropylene glycol butyl ether ester and about 6 percent of the tripropylene glycol butyl ether ester of a α-(2,4,5-trichlorophenoxy)propionic acid.

Each of the above compositions was found to be adapted for the preparation of herbicidal water-in-oil emulsion compositions. In typical operations, each composition was employed in the proportions of one gallon of composition to 14 gallons of diesel oil with sufficient water to produce 100 gallons of finished emulsion. In preparing the emulsion the composition was dissolved in the diesel oil and to the resulting solution the water was added portionwise with vigorous stirring to produce the finished viscous water-in-oil emulsion.

*Example 5*

The glycol ether esters as employed in Example 1 were used in preparing the following concentrate composition:

| Ingredient: | Percent by weight |
|---|---|
| Glycol ether ester of 2,4-dichlorophenoxyacetic acid | 35 |
| Glycol ether ester of 2,4,5-trichlorophenoxyacetic acid | 35 |
| Sorbitan trioleate | 10 |
| Heavy aromatic naphtha | 20 |

One part by volume of this composition was dissolved in 10 parts by volume of kerosene. To the resulting solution, 25 parts by volume of water was added portionwise with vigorous stirring to produce the water-in-oil emulsion as a thick viscous composition suitable for spray application for the control of woody brush and broad leaved weeds.

*Example 6*

The glycol ether ester of 2,4,5-trichlorophenoxyacetic acid of Example 1 was formulated as follows:

| Ingredient: | Percent by weight |
|---|---|
| Glycol ether ester of 2,4,5-trichlorophenoxyacetic acid | 35 |
| Armour RD–1918 | 20 |
| Heavy aromatic naphtha | 45 |

Armour RD–1918 is identified as a mixture of equal parts of (1) a compound produced by reacting one mole of normal-octadecylamine with two moles of ethylene oxide and (2) a compound resulting from the reaction of one mole of octadecylamine with 5 moles of ethylene oxide.

The above composition was mixed with oil and water as in Example 4 to produce stable water-in-oil emulsion compositions.

*Example 7*

The following compositions were prepared by blending the ingredients to produce homogeneous liquid concentrates.

Ingredient:

| Composition | Parts by Weight | | |
|---|---|---|---|
| | D | E | F |
| Glycol ether ester of 2,4,5-trichlorophenoxyacetic acid | 64 | 35 | 18.4 |
| Sorbitan mono-oleate | 20 | 20 | 20.0 |
| Heavy aromatic naphtha | 16 | 45 | 61.6 |
| Acid equivalent of 2,4,5-trichlorophenoxyacetic acid, pounds per gallon | 4 | 2 | 1 |

The glycol ether ester employed above was that described in Example 1.

Each of the above compositions was mixed with fuel oil and water in the manner and proportions as described in Example 4 to produce a series of water-in-oil emulsion compositions containing, respectively, 4, 2 and 1 pounds acid-equivalent of 2,4,5-trichlorophenoxyacetic acid. These compositions were applied to hibiscus plants so that each plant received the same measured quantity of one of the compositions distributed over 6 leaves. On observation after several weeks, it was found that excellent kills of leaves and stems of the hibiscus plants had been obtained.

*Example 8*

The glycol ether esters of Example 1 were formulated in the following concentrate composition:

Ingredient:                                         Percent by weight
    Ester of 2,4-dichlorophenoxyacetic acid _____ 35.9
    Ester of 2,4,5-trichlorophenoxyacetic acid ____ 34.8
    Atlas G–2855 _____ 6.0
    Aromatic oil _____ 23.3

Atlas G–2855 is identified as a polyoxyethylene sorbitol pentaoleate. The aromatic oil employed was a petroleum product marketed as Shell E–407 oil.

One gallon of the above concentrate is dissolved in 10 gallons of light diesel oil and to the resulting solution sufficient water is added portionwise with vigorous agitation from a paddle agitator to produce 100 gallons of viscous water-in-oil emulsion composition. The latter is adapted for application for the control of mixed broad-leaved brush.

We claim:

1. A method which comprises applying to the aboveground parts of vegetation a viscous, water-in-oil emulsion comprising water, an emulsifying agent and a solution of a herbicidal amount of a systemic herbicide in a water-immiscible, organic solvent, the proportions of said solvent and water being adjusted to provide from about 10 to about 35 parts by volume of the solvent per 100 parts by volume of finished emulsion.

2. A composition which comprises, in viscous, water-in-oil emulsion form, water, an emulsifying agent and a solution of a herbicidal amount of a systemic herbicide in a water-immiscible, organic solvent, the proportions of said solvent and water being adjusted to provide from about 10 to about 35 parts by volume of the solvent per 100 parts by volume of finished emulsion.

3. A composition which consists of a viscous, water-in-oil emulsion comprising an intimate mixture of water, at least about 0.04 percent by weight of an emulsifier, based on the total weight of said emulsion, and a solution of a herbicidal amount of a systemic herbicide in a water-immiscible, organic solvent, the proportions of said solvent and water being adjusted to provide from about 10 to about 35 parts by volume of the solvent per 100 parts by volume of finished emulsion.

4. A composition which consists of a viscous water-in-oil emulsion comprising an intimate mixture of water, at least about 0.04 percent by weight of emulsifier and a solution of at least about 0.03 percent by weight of a systemic herbicide in a water-immiscible organic solvent, the percentages being based on the total weight of emulsion and the proportions of said solvent and water being adjusted to provide from about 10 to about 35 parts by volume of the solvent per 100 parts by volume of finished emulsion.

5. A composition according to claim 2, wherein the systemic herbicide is selected from the group consisting of 2,4-dichlorophenoxyacetic acid, 2,4,5-trichlorophenoxyacetic acid, 4-chloro-2-methylphenoxyacetic acid, 3,4-dichlorophenoxyacetic acid, α-(2,4,5-trichlorophenoxy)propionic acid and gamma-(2,4-dichlorophenoxy)butyric acid and the oil-soluble esters thereof.

6. A herbicidal composition comprising a water-insoluble organic systemic herbicide admixed in a water-in-mineral oil emulsion in which there is at least as much water as oil, said herbicide being present in a concentration and amount sufficient to exert herbicidal action.

7. A method of destroying plants comprising the application to a plant in an amount sufficient to destroy the same of a water-in-mineral oil emulsion containing a water-insoluble organic systemic herbicide in which there is at least as much water as oil.

References Cited by the Examiner

UNITED STATES PATENTS

| | | | |
|---|---|---|---|
| 1,645,642 | 10/27 | Blackadder. | |
| 2,144,808 | 1/39 | Parker | 167—43 |
| 2,394,916 | 2/46 | Jones | 71—2.6 |
| 2,396,513 | 3/46 | Jones | 71—2.6 |
| 2,453,983 | 11/48 | Sexton et al. | 71—2.6 |
| 2,726,150 | 12/55 | Wolter | 71—2.6 |
| 2,805,927 | 9/57 | Hamm | 71—2.7 |
| 2,834,731 | 5/58 | Carpenter | 71—2.3 X |
| 2,863,753 | 12/58 | Wain | 71—2.6 |
| 2,863,754 | 12/58 | Wain | 71—2.6 |

OTHER REFERENCES

Ahlgren et al., "Principles of Weed Control," publ. by J. Wiley and Sons, Inc., New York, 1951, pp. 35–75 inc.

Bennett, "Practical Emulsions," publ. by Chemical Publishing Co., 1947, pages 60 and 61.

"Emulsion Technology," publ. by Chemical Publishing Co., New York, 1943, pages 8, 16, 19 to 23 inclusive, 128, 129, 146 and 147.

"Emulsion Technology," publ. by Chemical Publishing Co., New York, 1946, pages 146, 147 and 300 to 302.

JULIAN S. LEVITT, *Primary Examiner.*

B. S. JENKINS, M. A. BRINDISI, G. D. MITCHELL,
                                    *Examiners.*